US009224332B2

(12) United States Patent
Byun et al.

(10) Patent No.: US 9,224,332 B2
(45) Date of Patent: Dec. 29, 2015

(54) ORGANIC LIGHT-EMITTING DISPLAY DEVICE

(75) Inventors: Seung-Chan Byun, Gyeonggi-do (KR); Jung-Yoon Yi, Gyeonggi-do (KR); Dae-Hyeon Park, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 379 days.

(21) Appl. No.: 13/588,474

(22) Filed: Aug. 17, 2012

(65) Prior Publication Data

US 2013/0083087 A1 Apr. 4, 2013

(30) Foreign Application Priority Data

Oct. 4, 2011 (KR) ........................ 10-2011-0100874

(51) Int. Cl.

| | |
|---|---|
| ***G09G 3/32*** | (2006.01) |
| ***G09G 3/36*** | (2006.01) |
| ***G06F 3/02*** | (2006.01) |
| ***G06F 3/041*** | (2006.01) |

(52) U.S. Cl.

CPC ...... *G09G 3/3233* (2013.01); *G09G 2300/0819* (2013.01); *G09G 2300/0861* (2013.01); *G09G 2310/0262* (2013.01); *G09G 2320/043* (2013.01); *G09G 2320/045* (2013.01); *G09G 2320/0673* (2013.01); *G09G 2360/16* (2013.01)

(58) Field of Classification Search

CPC .................. G09G 2320/0276; G09G 2360/16; G09G 2320/0626; G09G 3/3648; G09G 3/3611

See application file for complete search history.

(56) References Cited

U.S. PATENT DOCUMENTS

| | | | | |
|---|---|---|---|---|
| 2005/0162361 | A1* | 7/2005 | Chuang et al. | 345/89 |
| 2006/0164360 | A1 | 7/2006 | Wakabayashi | |
| 2007/0008297 | A1* | 1/2007 | Bassetti | 345/173 |
| 2008/0001545 | A1 | 1/2008 | Uchino et al. | |
| 2009/0206770 | A1 | 8/2009 | Hong et al. | |
| 2010/0039411 | A1 | 2/2010 | Yatabe et al. | |
| 2010/0053233 | A1* | 3/2010 | Ishiguro et al. | 345/690 |
| 2010/0220927 | A1* | 9/2010 | Kim et al. | 382/170 |
| 2011/0050749 | A1* | 3/2011 | Park | 345/690 |
| 2011/0141000 | A1* | 6/2011 | Han et al. | 345/82 |
| 2012/0075354 | A1* | 3/2012 | Su et al. | 345/690 |
| 2013/0063498 | A1 | 3/2013 | Yabukane | |

FOREIGN PATENT DOCUMENTS

JP 2013-061390 A 4/2013

OTHER PUBLICATIONS

Japanese Office Action dated Dec. 3, 2013 for corresponding JP Office Action 2012-222065.
Extended European Search Report dated Jan. 7, 2014 for corresponding Application No. EP12181906.4.

* cited by examiner

*Primary Examiner* — Ngan Pham Lu
(74) *Attorney, Agent, or Firm* — Morgan, Lewis & Bockius LLP

(57) ABSTRACT

An organic light-emitting display device includes: an organic light-emitting panel in which a plurality of pixel regions are arranged, the pixel regions each including a drive transistor configured to drive an organic light emission element and a sensing transistor configured to detect a threshold voltage of the drive transistor during a sensing interval; and a controller configured to compare a pixel number of a low grayscale range and a pixel number of a high grayscale range, which are obtained from an image signal, and adjust the sensing interval according to a compared resultant.

21 Claims, 11 Drawing Sheets

<DOMINATION OF LOW GRAYSCALE PIXELS>

<DOMINATION OF HIGH GRAYSCALE PIXELS>

ORGANIC LIGHT-EMITTING DISPLAY DEVICE

The present application claims priority under 35 U.S.C. §119(a) of Korean Patent Application No. 10-2011-0100874 filed on Oct. 4, 2011, which is hereby incorporated by reference in its entirety.

BACKGROUND

1. Field of the Disclosure

The present application relate to an organic t-emitting display device.

2. Description of the Related Art

Flat type devices for displaying information are being widely developed. The display devices include liquid crystal display devices, organic light-emitting display devices, electrophoresis display devices, field emission display devices, and plasma display devices.

Among these display devices, organic light-emitting display devices have the features of lower power consumption, wider viewing angle, lighter weight and higher brightness compared to liquid crystal display devices. As such, the organic light-emitting display device is considered to be next generation display devices.

Thin film transistors used in the organic light-emitting display device can be driven in high speed. To this end, the thin film transistors increase carrier mobility using a semiconductor layer which is formed from polysilicon. Polysilicon can be derived from amorphous silicon through a crystallizing process.

A laser scanning mode is widely used in the crystallizing process. During such a crystallizing process, the power of a laser beam may be unstable. As such, the thin film transistors formed along the scanned line, which is scanned by the laser beam, can have different threshold voltages from each other due to different mobilities in each thin film transistor. This can cause image quality to be non-uniform between pixel regions.

To address this matter, a technology detecting the threshold voltages of pixel regions and compensating for the threshold voltages of thin film transistors had been proposed.

A threshold voltage of the pixel region(s) is compensated with a compensation data that is generated based on the detected threshold voltage, such that a driving current is irrespective of the threshold voltage of the pixel region.

The driving current in which the threshold voltage is compensated is represented as the following.

$$I=C(VDD-V\text{data})^2,$$

Wherein C is constant, VDD is a power supply voltage, and Vdata is a data voltage.

The method of the related art detects the threshold voltages of the thin film transistors during a fixed sensing interval, as shown in FIG. 6.

However, the above-mentioned crystallizing process using the laser beam forces the thin film transistors to have different mobilities. As such, when the sensing interval is fixed, the detected threshold voltage can be different due to variation of the mobility.

More specifically, if high mobility maintained during the sensing interval, the threshold voltage can be precisely detected. On the contrary, when low mobility is maintained during the sensing interval, a voltage higher than the real threshold voltage of the thin film transistor can be detected.

In other words, in the related art method using the fixed sensing interval, it is difficult to detect accurate threshold voltages. As such, the threshold voltages cannot be compensated for accurately. In accordance therewith, the non-uniformity of picture quality cannot be removed.

In addition, a mura phenomenon such as a line mura can be caused by different mobilities of the scanned lines. The line mura is generated when brightness between pixels on lines, for example gate lines in the display device are different from each other.

The sensing interval can be adjusted to be short, as shown in FIG. 7. In this case, variation of mobility can be reflected in the detected threshold voltage, but the mura phenomenon can be easily recognized in low gray scale levels.

On the contrary, the sensing interval can be adjusted to be long. In this case, non-uniformity of brightness caused by different threshold voltages can be removed, but it is not easy to eliminate the line mura which is caused by the variation of mobility in high gray scale levels.

Furthermore, as mobility in the sensing interval becomes lower, a voltage higher than an original data voltage is applied to a pixel region. Due to this, brightness defects can be caused.

BRIEF SUMMARY

Accordingly, embodiments of the present application are directed to an organic light-emitting display device that substantially obviates one or more of problems due to the limitations and disadvantages of the related art.

The embodiments are to provide an organic light-emitting display device that is adapted to prevent non-uniformity of picture quality by compensating for a threshold voltage and mobility.

Also, the embodiments are to provide an organic light-emitting display device that is adapted to suppress the generation of mura phenomenon by adjusting a sensing interval according to a gray scale level.

Furthermore, the embodiments are to provide an organic light-emitting display device that is adapted to obviate a brightness problem by controlling brightness according to a sensing interval adjustment.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to a first general aspect of the present embodiment, an organic light-emitting display device includes:

an organic light-emitting panel in which a plurality of pixel regions are arranged, each of the pixel regions including a drive transistor configured to drive an organic light emission element and a sensing transistor configured to detect a threshold voltage of the drive transistor during a sensing interval; and a controller configured to compare the pixel number of a low grayscale range and the pixel number of a high grayscale range, which are obtained from an image signal, and adjust the sensing interval according to a compared resultant.

An organic light-emitting display device according to a second general aspect of the present embodiment includes:

an organic light-emitting panel in which a plurality of pixel regions are arranged, each of the pixel regions including a drive transistor configured to drive an organic light emission element and a sensing transistor configured to detect a threshold voltage of the drive transistor during a sensing interval; and a controller configured to detect pixels included in a mura-recognizable area from an image signal, calculate a low grayscale proportion based on the detected pixels of the mura-recognizable area, and adjust the sensing interval on the basis of the low grayscale proportion.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION

In the present disclosure, it will be understood that when an element, such as a substrate, a layer, a region, a film, or an electrode, is referred to as being formed "on" or "under" another element in the embodiments, it may be directly on or under the other element, or intervening elements (indirectly) may be present. The term "on" or "under" of an element should include the meanings of "an upward direction" or "a downward direction" in the center of the element.

Figure 1:
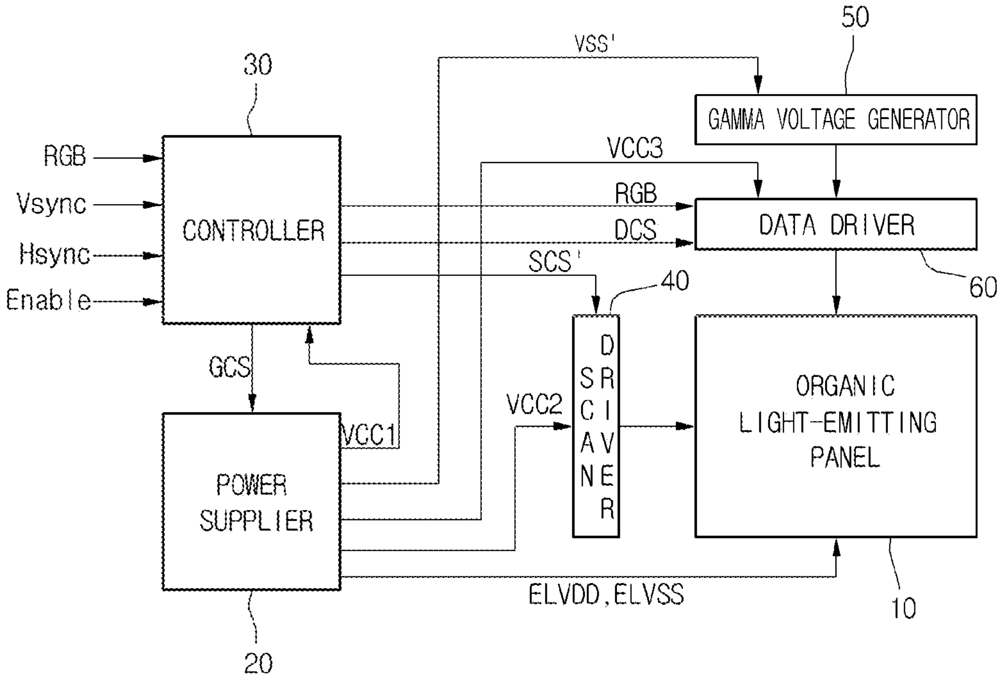
FIG. 1 is a block diagram showing an organic light-emitting display device according to an embodiment of the present disclosure.

FIG. 1 is a block diagram showing an organic light-emitting display device according to an embodiment of the present disclosure.

Referring to FIG. 1, the organic light-emitting display device according to an embodiment of the present disclosure includes an organic light-emitting panel 10, a controller 30, a power supplier 20, a gamma voltage generator 50, a scan driver 40 and a data driver 60.

The scan driver 40 applies scan signals to the organic light-emitting panel 10.

The data driver 60 applies data voltages to the organic light-emitting panel 10.

The gamma voltage generator 50 generates gamma voltages. The gamma voltages are applied to the data driver 60, and are used to generate data voltages corresponding to image signals R, G and B which are applied from the controller 30.

More specifically, the data driver 60 generates the data voltages corresponding to the image signals R, G and B using the gamma voltages which are applied from the gamma voltage generator 50.

Figure 2:
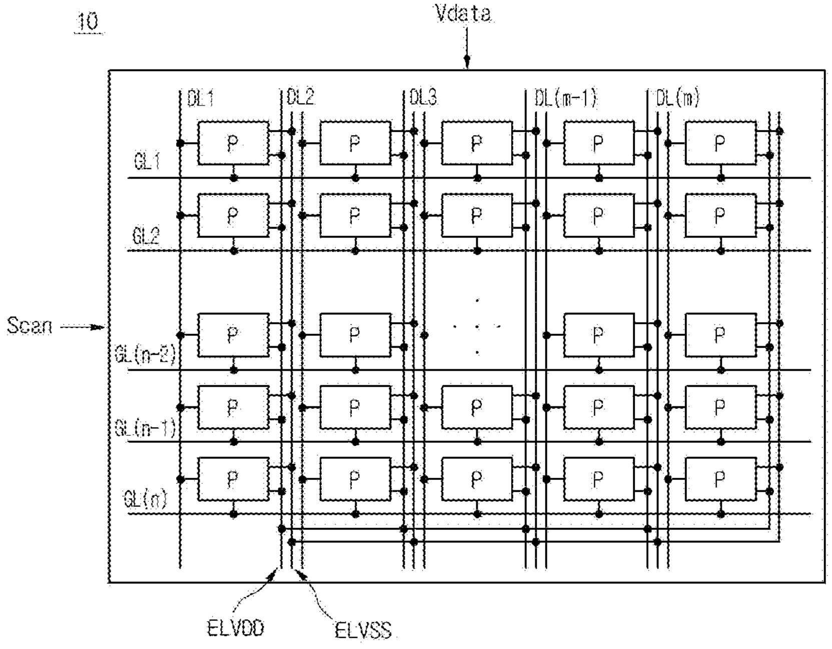
FIG. 2 is a circuit diagram showing an organic light-emitting panel of FIG. 1.

The organic light-emitting panel 10 includes a plurality gate lines GL1~GLn, a plurality of data lines DL1~DLm, a plurality of first power supply lines and a plurality of second power supply lines, as shown in FIG. 2.

Although it is not shown in the drawings, the organic light-emitting panel 10 can further include a plurality of signal lines, if necessary.

A plurality of pixel regions P are defined by the gate and data lines GL1~GLn and DL1~DLm which are crossed with each other. These pixel regions P can be arranged in a matrix. Each of the pixel regions P is electrically connected to one of the gate lines GL1~GLn, one of the data lines DL1~DLm, one of the first power supply lines and one of the second power supply lines.

For example, the gate lines GL1~GLn are electrically connected to the plurality of pixel regions P arranged in a horizontal direction. The data lines DL1~DLm are electrically connected to the plurality of pixel regions P arranged in a vertical direction.

Such a pixel region P receives a scan signal "Scan", a data voltage Vdata, a first power supply voltage ELVDD and a second power supply voltage ELVSS. More specifically, the scan signal Scan can be sequentially applied to the pixel region P through the gate lines GL1~GLn, and the data voltage Vdata can be applied to the pix region P via the data lines DL1~DLm. The first power supply voltage ELVDD and the second power supply voltage ELVSS can be applied to the pixel region P through a first power supply line and a second power supply line respectively.

Figure 3:
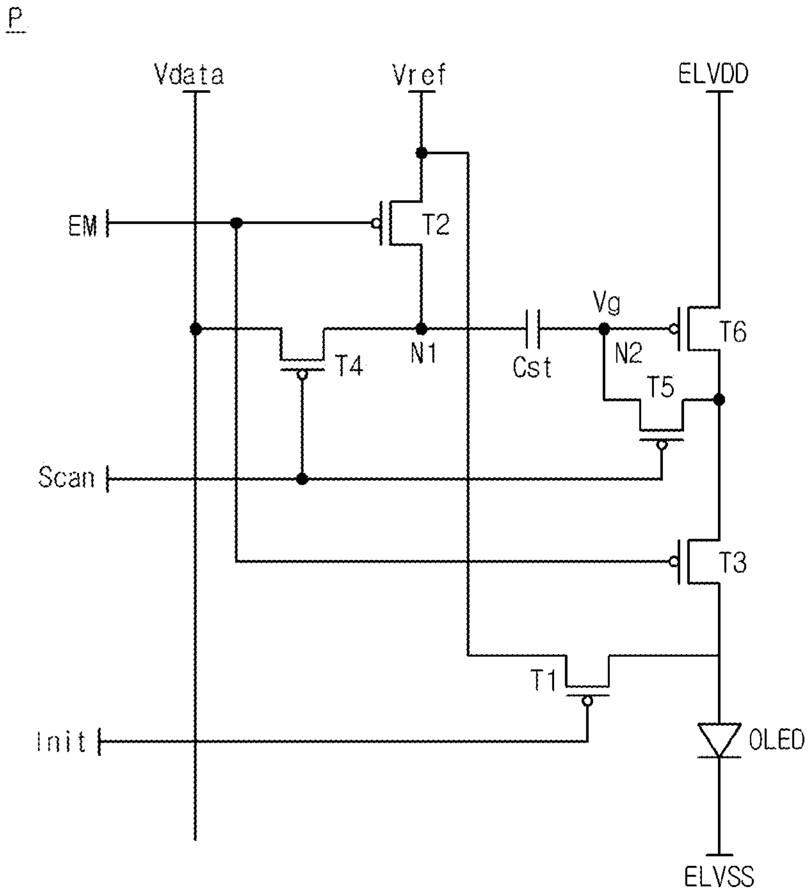
FIG. 3 is a detailed circuit diagram showing a pixel region of FIG. 2.

As shown in FIG. 3, first through sixth transistors T1~T6, a storage capacitor Cst and an organic light emission element OLED can be formed in each of the pixel regions P, but it is not limited to this. In other words, the number of transistors and a connection structure therebetween within each of the pixel regions can be modified in a variety of shapes by a designer. As such, this embodiment can be applied to a variety of circuit structures of the pixel region which can be modified by designers.

The first through fifth transistor T1~T5 are switching transistors used to transfer signals. The sixth transistor T6 is a drive transistor used to generate a drive current for driving the organic light emission element OLED.

The storage capacitor Cst serves the function of maintaining the data voltage Vdata for one frame period.

The organic light emission element OLED is a device that is configured to emit light. The organic light emission element OLED can emit light whose brightness varies with intensity of the drive current. Such an organic light emission element OLED can include a red organic light emission element OLED that is configured to emit red light, a green organic light emission element OLED that is configured to emit green light, and a blue organic light emission element OLED that is configured to emit blue light.

The first through sixth transistors T1~T6 can be PMOS-type thin film transistors, but it is not limited to this. The first through sixth transistors T1~T6 can be turned-on by a low level signal and turned-off by a high level signal.

The high level signal can be a ground voltage or a voltage close to the ground voltage. The low level signal can be a voltage lower than the ground voltage. For example, the high level can be 0V and the low level can be −10V, respectively, but it is not limited to this.

The first power supply voltage ELVDD can be a high level signal. The second power supply voltage ELVSS can be a low level signal. The first and second power supply voltages ELVDD and ELVSS can be both DC (Direct Current) voltages having fixed levels.

A gate electrode of the first transistor T1 is connected to an initial signal line to which an initial signal Init is applied. A source electrode of the first transistor T1 is connected to a signal line to which a reference voltage Vref is applied. A drain electrode of the first transistor T1 is connected to a node between the organic light emission element OLED and the third transistor T3. Such a first transistor T1 can be turned-on by the initial signal Init with a low level and the reference voltage is applied to the organic light emission element OLED.

A gate electrode of the second transistor T2 is connected to a light emission signal line to which a light emission signal EM is applied. A source electrode of the second transistor T2 is connected to the reference signal line to which the reference voltage Vref is applied. A drain electrode of the second transistor T2 is connected to a first node N1 between the fourth transistor T4 and the storage capacitor Cst. The second transistor T2 can be turned-on by the light emission signal EM having a low level and enable the reference voltage Vref to be applied to the storage capacitor Cst.

A gate electrode of the third transistor T3 is connected to the light emission signal line to which the light emission signal EM is applied. A source electrode of the third transistor T3 is connected to the fifth and sixth transistors T5 and T6. A drain electrode of the third transistor T3 is connected to the organic light emission element OLED. The third transistor T3 can be turned-on by the light emission signal EM having a low level and enable the drive current from the sixth transistor T6 to be applied to the organic light emission element OLED.

A gate electrode of the fourth transistor T4 is connected to the gate line to which the scan signal Scan is applied. A source electrode of the fourth transistor T4 is connected to the data line to which the data voltage Vdata is applied. A drain electrode of the fourth transistor T4 is connected to the first node N1. The fourth transistor T4 can be turned-on by the scan signal Scan having a low level and enable the data voltage Vdata to be transferred from the data line to the storage capacitor Cst.

The drain electrodes of both the second and fourth transistors T2 and T4 and the storage capacitor Cst are commonly connected to the first node N1.

A gate electrode of the fifth transistor T5 is connected to the gate line to which the scan signal Scan is applied. A source electrode of the fifth transistor T5 is connected to a second node N2. A drain electrode of the fifth transistor T5 is connected to the node between the third and sixth transistors T3 and T6. The fifth transistor T5 can be turned-on by the scan signal Scan having a low level and hence a threshold voltage of the sixth transistor T6 is detected by the fifth transistor. In other words, the fifth transistor T5 may be a sensing transistor which is used to sense the threshold voltage of the sixth transistor T6.

The storage capacitor Cst, the source electrode of the fifth transistor T5 and a gate electrode of the sixth transistor T6 are commonly connected to the second node N2. As such, the storage capacitor Cst disposed between the first and second nodes N1 and N2 can enable a voltage at the second node N2 to vary with the variation of a voltage at the first node N1. The voltage at the second node N2 is referred to as a gate voltage Vg because it is a voltage which is applied to the gate electrode of the sixth transistor T6.

The gate electrode of the sixth transistor T6 is connected to the second node N2. A source electrode of the sixth transistor T6 is connected to the first power supply line to which the first power supply voltage ELVDD is applied. A drain electrode of the sixth transistor T6 is connected to the third and fifth transistors T3 and T5.

Figure 4:
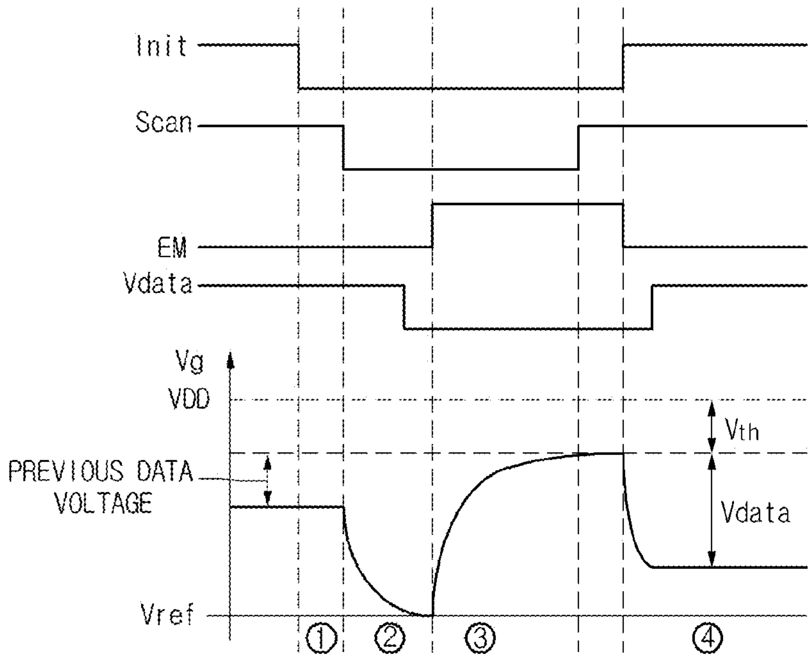
FIG. 4 is a waveform diagram illustrating signals for driving the pixel region.

Such a circuit configuration of the pixel region in FIG. 3 can be driven by signals with waveforms as shown in FIG. 4.

As shown in FIG. 4, the circuit configuration within the pixel region can be driven according to four individual intervals.

A first interval ① is an initial period in which the organic light emission element OLED is initiated. A second interval ② is another initial period in which the storage capacitor Cst, i.e., the second node is initiated. A third interval ③ is a sensing period in which the threshold voltage of the sixth transistor T6 is sensed. A fourth interval ④ is a driving period or light-emitting period in which the organic light emission element OLED is allowed to be driven or emit light.

The operation of the circuit configuration of the pixel region will now be described in detail in terms of the first through fourth intervals ①, ②, ③ and ④ referring to FIGS. 5A through 5D.

<First Interval>

Figure 5A:
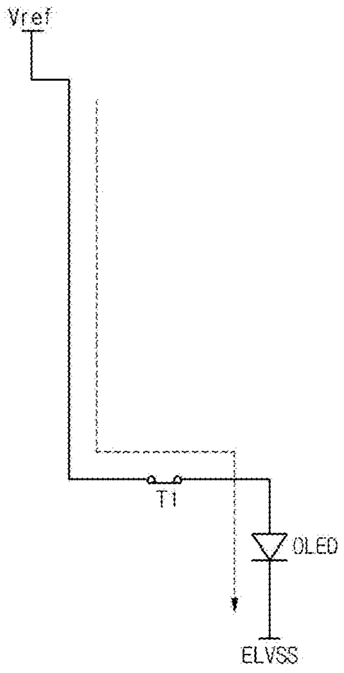
FIGS. 5A through 5D are circuit diagrams showing switching states of transistors when the pixel region is driven in time intervals.

As shown in FIG. 5A, the initial signal Init and the light emission signal EM both having a low level are applied to the pixel region P for the first interval ①.

The initial signal Init with the low level is applied to the first transistor T1 via the initial signal line. The first transistor T1 can be turned-on by the initial signal Init with the low level and can enable the reference voltage Vref to be applied to the organic light emission element OLED through the first transistor T1. As such, the organic light emission element OLED can be discharged by the reference voltage Vref and the second power supply voltage ELVSS applied to its both ends, and an initiation operation is thus performed.

At this time, the voltage at the second node N2 can maintain a previous data voltage which had been charged in a previous frame.

Meanwhile, the light emission signal EM having the low level can be applied to the second transistor T2 and the third transistor T3 via the light emission signal line. As such, the second transistor T2 can be turned-on by the light emission signal with the low level, and the reference voltage Vref is applied to the first node N1. The third transistor T3 can also be turned-on by the light emission signal EM with the low level and the drive current from the sixth transistor T6 is applied to the organic light emission element OLED.

However, since the reference voltage Vref is applied to the organic light emission element OLED via the first transistor T1 as described above, the organic light emission element OLED can stop emitting light and can be initiated.

<Second Interval>

Figure 5B:
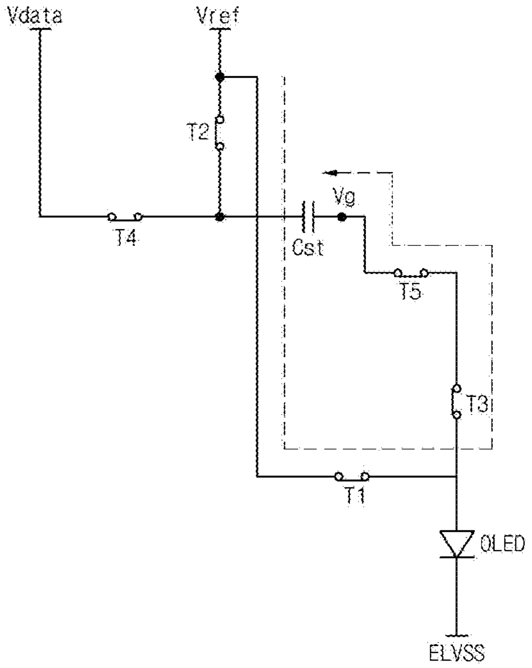

In the second interval ②, the initial signal Init, the light emission signal EM and the scan signal Scan both having the low level are applied to the pixel region P, as shown in FIG. 5B.

The initial signal Init with the low level can be applied to the first transistor T1 via the initial signal line. The first transistor T1 can be turned-on by the initial signal Init and can enable the reference voltage Vref to be applied to the organic light emission element OLED through the first transistor T1.

The light emission signal EM with the low level can be applied to the second transistors T2 and the third transistor T3 via the light emission signal line. The second transistor T2 can be turned-on by the light emission signal with the low level and the reference voltage Vref is applied to the first node N1. The third transistor T3 can also be turned-on by the light emission signal EM with the low level.

The scan signal Scan with the low level can be applied to the fourth transistor T4 and the fifth transistor T5. The fourth transistor T4 can be turned-on by the scan signal Scan with the low level and the data voltage Vdata from the data line is applied to the first node N1. The fifth transistor T5 can also be turned-on by the scan signal Scan with the low level.

As such, since the second transistor T2 and the fourth transistor T4 are turned-on, the reference voltage Vref and the data voltage Vdata can be applied to the first node through the second transistor T2 and the fourth transistor T4 respectively. In this case, the first node N1 can be charged with the reference voltage Vref because the reference voltage Vref has a voltage level lower than that of the data voltage Vdata.

Meanwhile, a closed loop starting from the first node N1 passing through the second transistor T2, the first transistor T1, the third transistor T3, the fifth transistor T5 and the storage capacitor Cst and returning to the first node N1 can be formed because the first through third and fifth transistors T1, T2, T3 and T5 are turned on. As such, the reference voltage Vref can also be provided to the second node N2 via the first, third and fifth transistors T1, T3 and T5. In accordance therewith, the gate voltage Vg at the second node N2 is discharged and is lowered from the data voltage Vdata to the reference voltage Vref. Therefore, an initiation of the storage capacitor Cst can be performed.

<Third Interval>

Figure 5C:
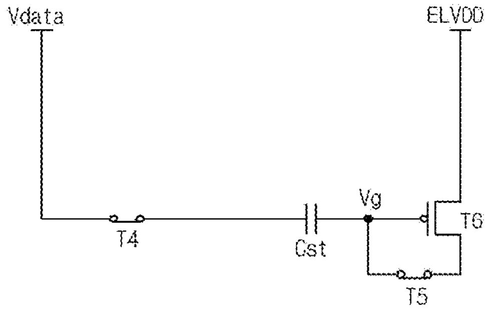

As shown in FIG. 5C, the initial signal Init and the scan signal Scan both having the low level are applied to the pixel region P for the third interval ③.

The initial signal Init with the low level can be applied to the first transistor T1 via the initial signal line. The first transistor T1 can be turned-on by the initial signal Init and can enable the reference voltage Vref to be applied to the organic light emission element OLED through the first transistor T1.

However, the third transistor T3 is turned-off by the light emission signal EM with a high level. As such, the drive current from the sixth transistor T6 can be not applied to the organic light emission element OLED.

The fourth and fifth transistors T4 and T5 can be turned-on by the scan signal Scan with the low level. As such, the first node N1, which is connected to the storage capacitor Cst, can be charged with the data voltage Vdata via the fourth transistor T4.

The fifth transistor T5 is also turned-on by the scan signal Scan with the low level and enables the gate and drain electrodes of the sixth transistor T6 to be connected to each other. As such, the sixth transistor T6 has a diode-connected structure. In accordance therewith, the second node N2, which is connected to the storage capacitor Cst, can be charged with a different voltage (ELVDD-Vth) between the first power supply voltage ELVDD and the threshold voltage Vth of the sixth transistor T6. In other words, the gate voltage Vg at the second node N2 becomes a voltage (ELVDD-Vth) between the first power supply voltage ELVDD and the threshold voltage Vth of the sixth transistor T6.

<Fourth Interval>

Figure 5D:
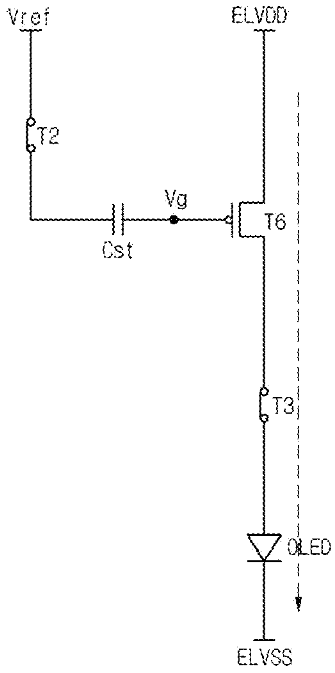

In the fourth interval ④, the light emission signal EM having the low level is applied to the pixel region P, as shown in FIG. 5D.

The light emission signal EM with the low level enables the second and third transistors T2 and T3 to be turned-on.

As such, the data voltage Vdata at the first node N1 of the storage capacitor Cst is discharged until it becomes the reference voltage Vref. In accordance therewith, the gate voltage Vg at the second node N2 of the storage capacitor Cst is also be discharged by the data voltage Vdata.

Consequently, the sixth transistor T6 generates a drive current being proportioned to a different voltage between the first power supply voltage ELVDD and the data voltage Vdata, and applies the drive current to the organic light emission element OLED. The drive current can enable the organic light emission element OLED to emit light.

Figure 8:
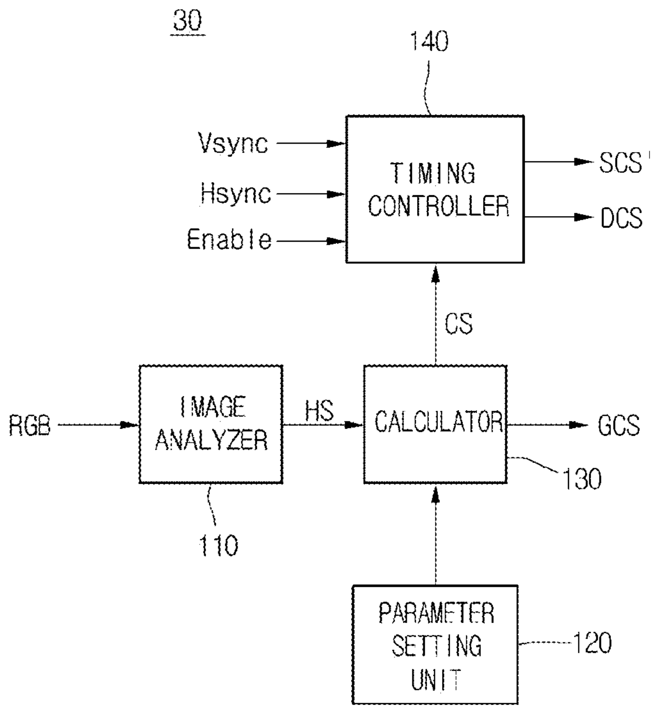
FIG. 8 is a block diagram showing the controller of FIG. 1 according to a first embodiment.

Referring to FIG. 8, the controller 30 according to a first embodiment includes an image analyzer 110, a calculator 130 and a timing controller 140. The controller 30 can further include a parameter setting unit 120 into which parameters, such as sensing Interval parameters according to gray scale levels and gamma voltage parameters according to the sensing intervals, are set.

If pixels corresponding to a high grayscale range are more than those corresponding to a low grayscale range within image of one frame, the sensing interval parameter can be set to be shortened. The sensing interval parameter to be shortened will be referred to as a first sensing interval parameter. When pixels corresponding to a high grayscale range are less than those corresponding to a low grayscale range within image of one frame, the sensing interval parameter can be set to be lengthened. The sensing interval parameter to be lengthened will be called as a second sensing interval parameter. However, the sensing interval parameters are not limited to these.

Figure 11A:
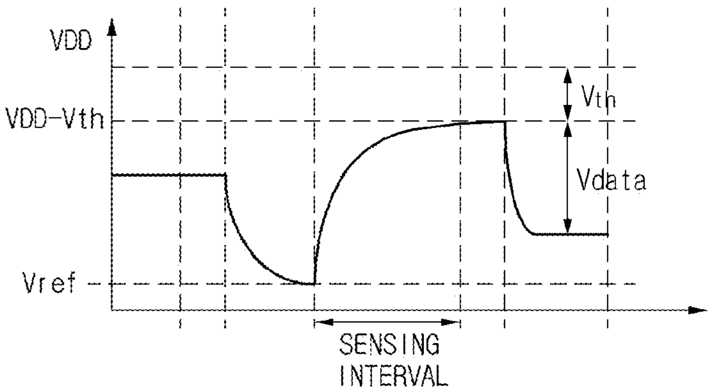
FIGS. 11A and 11B are data sheets illustrating a sensing interval which is varied along gray scale level.
Figure 11B:
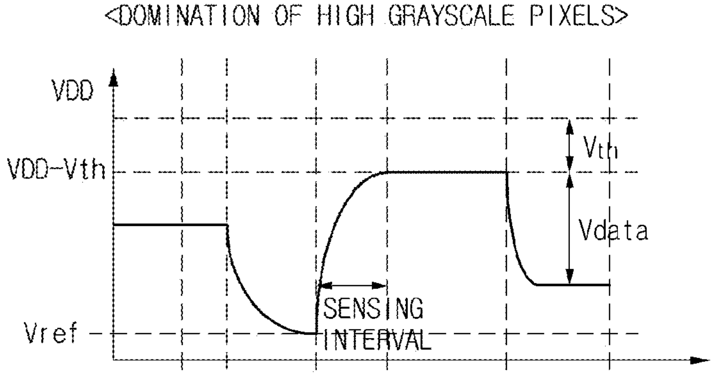

As shown in FIG. 11A, the sensing interval parameter can be set to be longer when the pixels of the low grayscale range become dominant within image of one frame with respect to those of the high grayscale range. On the contrary, as shown in FIG. 11B, when the pixels of the high grayscale range become dominant within image of one frame with respect to those of the low grayscale range, the sensing interval parameter can be set to be shorter. The first sensing interval parameter can be set to become shorter than the second sensing interval parameter. For example, the first sensing interval parameter can be set to be 1 μs and the second sensing interval parameter can be set to-be 4 μs, respectively, but these are not limited to these.

It is important that the sensing interval become shorter when pixels corresponding to the high grayscale range are more than those corresponding to the low grayscale range within image of one frame, compared to the situation in which it is not so.

In this manner, the sensing interval used to detect a threshold voltage Vth within the pixel region P is set to be shorter when pixels corresponding to the high grayscale range are more than those corresponding to the low grayscale range. In accordance therewith, the mura phenomenon being generated in the high grayscalegrayscales can be removed.

Also, a long sensing interval is set when pixels corresponding to the low grayscale range are more than those corresponding to the high grayscale range. Therefore, the mura phenomenon being generated in the low grayscalegrayscales can also be removed.

Figure 6:
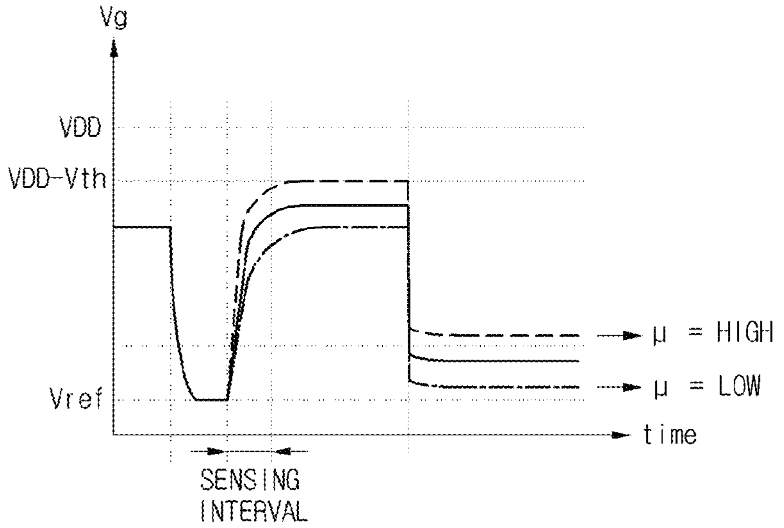
FIG. 6 is a data sheet illustrating detected voltages according to variation of mobility (μ)
Figure 7:
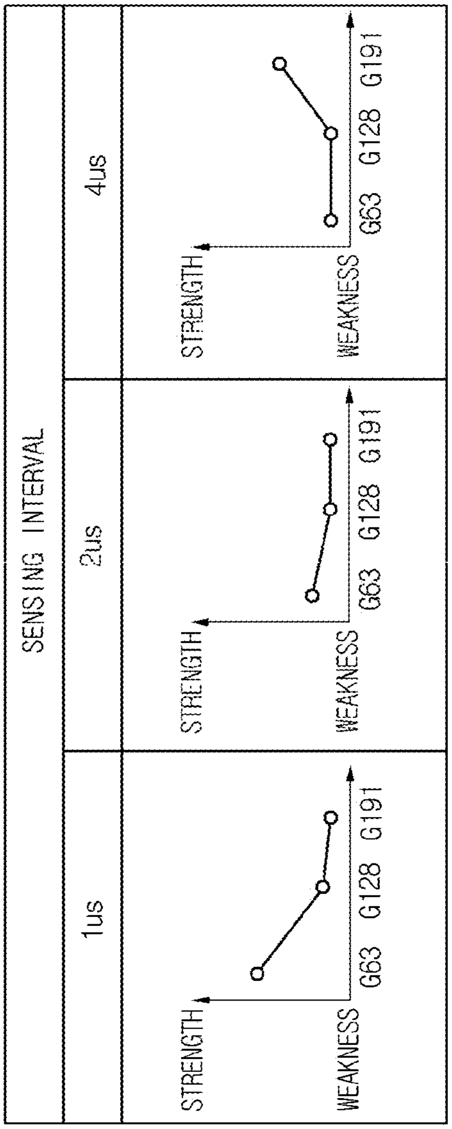
FIG. 7 is a data sheet illustrating degrees of recognized mura according to sensing time.

As previously described in connection with FIG. 6, brightness varies with the variation of the sensing interval. It is needed that brightness does not vary substantially, even though the sensing interval varies. To this end, the gamma reference voltages to be applied to the gamma voltage generator 50 shall be adjusted according to the sensing interval to maintain brightness without a variation of the sensing interval.

If the sensing interval parameter is set to be shorter, a voltage higher than the threshold voltage can be sensed during the shortened sensing interval. As such, the organic light emission element OLED can be driven by a voltage higher than an original data voltage. Due to this, the brightness higher than a desired degree can be obtained. To address this matter, the gamma reference voltages can be set to be lower.

On the contrary, when the sensing interval is set to be longer, an original threshold voltage can be sensed during the lengthened sensing interval. As such, the organic light emission element OLED can be driven by an original data voltage, thereby obtaining a desired brightness. In this case, the gamma reference voltages can be set to be an originally-set voltage level.

In view of these points, a first gamma reference voltage parameter is set to be a gamma reference voltage lower than an original gamma reference voltage and a second gamma reference voltage parameter is set to be the original voltage in the parameter setting unit 120, but it is not limited to this.

The first gamma voltage parameter can be set to a gamma reference voltagee lower than the original gamma reference voltage set as the second gamma voltage parameter.

The image analyzer 110 analyzes image signals R, G and B for one frame and generates a histogram signal HS. The histogram signal HS can be used to calculate the number of pixels for each grayscalegrayscale. Such a histogram signal HS is applied to the calculator 130.

The calculator 130 calculates the number of pixels corresponding to each of the low and high grayscale ranges on the basis of the histogram signal HS. The low grayscale range can include grayscalegrayscales of 0 through 127. The high grayscale range can include grayscales of 128 through 255.

The calculator 130 can compare the pixel number for the low grayscale range with the pixel number for the high grayscale range. Also, the calculator can read out a sensing interval parameter and a gamma reference voltage parameter from the parameter setting unit 120 according to a compared resultant.

The sensing interval parameter applied to the timing controller 140. The calculator 130 can derive a gamma control signal GCS from the gamma reference voltage parameter and apply the gamma control signal GCS to the power supplier 20.

For example, if the pixel number for the high grayscale range is larger than that for the low grayscale range, the first sensing interval parameter and the first gamma reference voltage parameter can be read out from the parameter setting unit 120. On the contrary, when the pixel number for the low grayscale range is larger than that for the high grayscale range, the second sensing interval parameter and the second gamma reference voltage parameter can be read out from the parameter setting unit 120.

The calculator 130 generates a control signal CS based on the sensing interval parameter from the parameter setting unit 120 and allows the control signal CS to be applied to the timing controller 140.

The timing controller 140 can receive a vertical synchronous signal Vsync, a horizontal synchronous signal Hsync and an enable signal Enable. Also, the timing controller 140 can derive scan control signals (hereinafter, "first scan control signals") SCS and data control signals DCS from the received signals. The first scan control signals SCS are used to drive the scan driver 40. The data control signals DCS are used to drive the data driver 60.

Although it is not shown in the drawings, a clock signal can be applied to the timing controller 140.

Such first scan control signal SCS and data control signals DCS can be generated through a variety of previously well-known methods.

Figure 9:
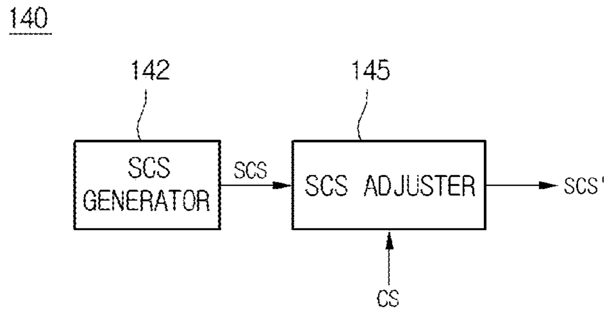
FIG. 9 is a block diagram showing the timing controller of FIG. 8.

The timing controller 140 can include a scan control signal generator 142 and a scan control signal adjuster 145, as shown in FIG. 9.

The scan control signal generator 142 can derive the first scan control signals SCS from the vertical synchronous signal Vsync, the horizontal synchronous signal Hsync and the enable signal Enable.

The scan control signal adjuster 145 can adjust the first scan control signals SCS on the basis of the control signal CS and can generate second scan control signals SCS' into which the first scan control signals SCS are adjusted.

As shown in FIG. 4, the sensing interval can be set depending on a period from a rising time point of the light emission signal EM to a rising time point of the scan signal Scan. In other words, the sensing interval can start at a transition point of the light emission signal EM which is shifted from the low level to the high level, and can end at a transition point of the scan signal Scan which is shifted from the low level to the high level.

The rising time point of the light emission signal EM can be fixed. As such, the sensing interval can be adjusted by the rising time point of the scan signal Scan. If the sensing interval is set to 4 μs for example, 4 μs can mean a period from the rising time point of the light emission signal EM to the rising time point of the scan signal Scan. Alternatively, when the sensing interval is set to 1 μs, 1 μs can mean a period from the rising time point of the light emission signal EM to the rising time point of the scan signal Scan.

Since the rising time point of the light emission signal EM is fixed, the sensing interval can be varied by shifting the rising time point of the scan signal Scan with respect to the rising time point of the light emission signal EM by 1 μs or 4 μs.

The scan signal Scan varies with the variation of the second scan control signals SCS'. As such, when the second scan control signals SCS' are varied, the scan driver 40, which is controlled by the varied second scan control signals SCS', can apply a varied scan signal Scan to the respective pixel region P of the organic light-emitting panel 10.

The scan control signal adjuster 145 can adjust the first scan control signals SCS on the basis of the control signal CS, in which the sensing interval is reflected, and can generate the second scan control signals SCS'. The second scan control signals SCS' are applied to the scan driver 40. As such, the scan driver 40 can vary a scan signal Scan in accordance with the second scan control signals SCS', and apply the varied scan signal SCS' to the respective pixel region P of the organic light-emitting panel 10.

Figure 10:
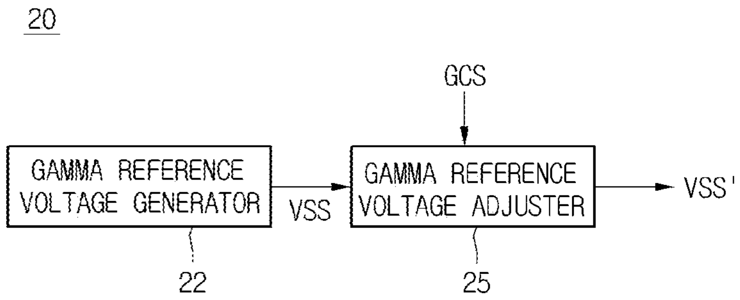
FIG. 10 is a block diagram showing the power supplier of FIG. 1.

As shown in FIG. 10, the power supplier 20 can include a gamma reference voltage generator 22 and a gamma reference voltage adjuster 25.

The power supplier 20 can further include a drive voltage generator which is not shown in the drawings. The drive voltage generator can generate first through third drive voltages VCC1 through VCC3. The first drive voltage VCC1 is used to drive the controller 30. The second drive voltage VCC2 is used to drive the scan driver 40. The third drive voltage VCC3 is used to drive the data driver 60.

The power supplier 20 can generate the gamma reference voltage VSS'. The gamma reference voltage VSS' can be applied to the gamma voltage generator 50 and used to generate a plurality of gamma voltages. Such a gamma reference voltage VSS' can be generated by generating a gamma reference voltage VSS in the gamma reference voltage generator 22 and then adjusting the gamma reference voltage VSS in a gamma reference voltage adjuster 25.

The gamma voltage generator 50 to which the gamma reference voltage VSS' is supplied can include a plurality of resistors serially connected between a ground line and a gamma reference voltage line for example. The ground line is used to transfer a ground voltage, and the gamma reference voltage line is used to transfer the gamma reference voltage VSS'. The plurality of gamma voltages can be generated at nodes between the resistors. Such gamma voltages can be produced by dividing the gamma reference voltage VSS' using a voltage division method. Therefore, the gamma voltages being generated at the nodes can vary with the variation of the gamma reference voltage VSS'.

The gamma reference voltage adjuster 25 can adjust the gamma reference voltage VSS generated by the gamma reference voltage generator 22 based on the gamma control signal GCS applied from the calculator 130 to generate the gamma reference voltage VSS'.

The gamma reference voltage VSS' is applied to the gamma voltage generator 50. If the gamma reference voltage VSS' is varied, the gamma voltages being generated in the gamma voltage generator 50 can also be varied.

Figure 12:
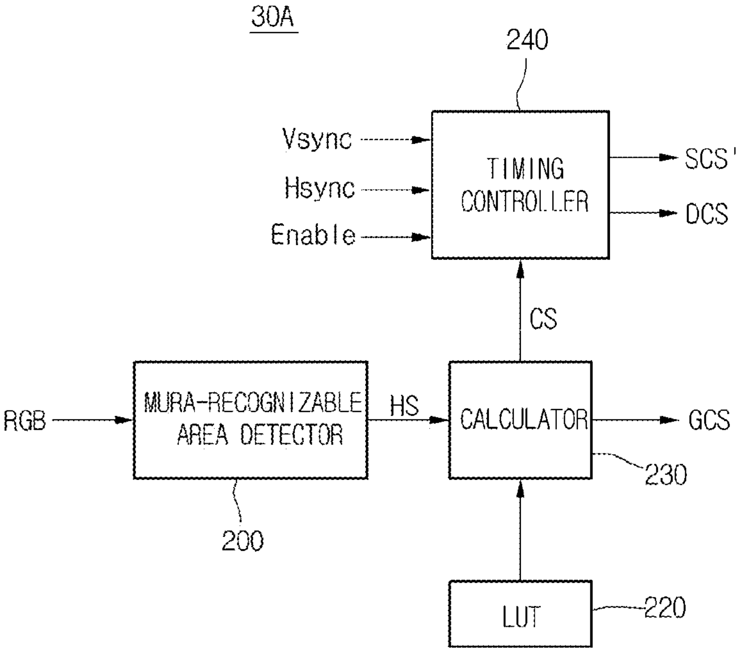
FIG. 12 is a block diagram showing the controller of FIG. 1 according to a second embodiment.

Another controller 30A different from the controller 30 of the first embodiment can be configured as shown in FIG. 12.

More specifically, the controller 30A according to a second embodiment can avoid unnecessary computations, and furthermore reduce the computational load of a system. To this end, the controller 30A can detect an area including pixels in which a mura phenomenon is easily generated before determining large and small in the pixel numbers for the low and high grayscale ranges, and can adjust the sensing interval and the gamma reference voltage for the detected area. It is difficult to recognize the mura phenomenon in a complex area in which pixels having lots of grayscales are included. As such, it is not necessary to compute for such a complex area.

In view of this point, the controller 30A according to the second embodiment can be used to eliminate the mura phenomenon from an area including pixels in which the mura phenomenon is easily generated.

Referring to FIG. 12, the controller 30A according to the second embodiment can include a mura-recognizable area detector 200, a calculator 230, a Look-up Table (LUT) 220 and a timing controller 240.

Figure 13:
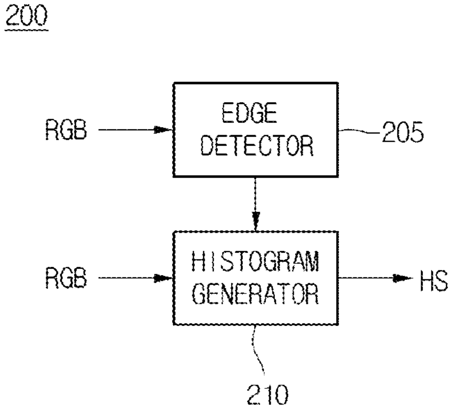
FIG. 13 is a block diagram showing the mura recognition region detector of FIG. 12.

The mura-recognizable area detector 200 can include an edge detector 205 and a histogram generator 210, as shown in FIG. 13.

The edge detector 205 can distinguish the area including pixies in which the mura phenomenon is easily recognized from the area including pixels in which the mura phenomenon is not easily recognized to detect a mura-recognizable area.

To this end, the edge detector 205 distinguishes the pixels having grayscale equal to or less than a reference value from the pixels having grayscale larger than the reference value, and eliminates the pixels having grayscale equal to or less than the reference value. For example, the reference value can be a grayscale of 10, but it is not limited to this.

The pixels having grayscales of 0 through 10 forms a dark image close to black. In such a dark image, it is difficult to recognize the mura phenomenon. As such, the pixels having the grayscales of 0 through 10 can be eliminated by the edge detector 205 in advance. In accordance therewith, computational loads of the histogram generator 210 and the calculator 230, which is comprised of the edge detector 205, can be reduced.

Also, it is not easy to recognize the mura phenomenon in an image including the pixels in which grayscale difference between the adjacent pixels is larger than a critical value, because the grayscale difference between the adjacent pixels is large. For example, the critical value can be a grayscale of 8, but it is not limited to this. In view of this point, such pixels in which grayscale difference between the adjacent pixels is larger than a critical value are filtered by the edge detector 205 in advance and are not applied to the histogram generator 210. Therefore, the computational loads of the histogram generator 210 and the calculator 230, can be reduced.

Consequently, the pixels, which have grayscales larger than the grayscale of 10 (reference value) and grayscale differences less than the grayscale of 8 (critical value), can only be applied from the edge detector 205 to the histogram generator 210.

Figure 14:
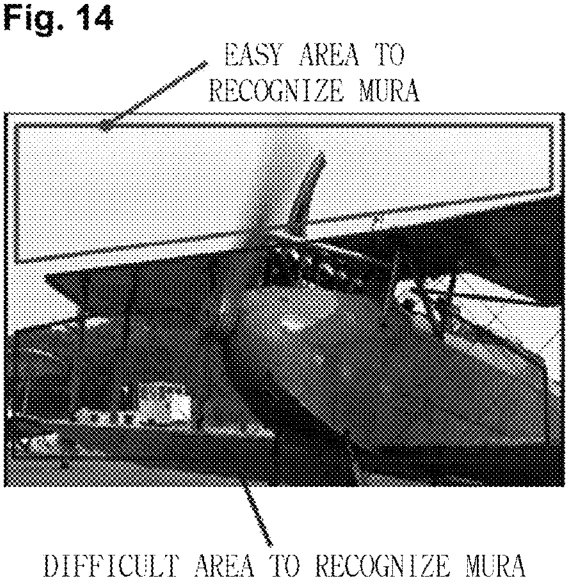
FIG. 14 is a photography showing an image which illustrates mura recognition degrees.

As shown in FIG. 14, the pixels included in the area in which the mura phenomenon is difficultly recognized are not applied to the histogram generator 210 by the edge detector 205. Only, the pixels included in the area in which the mura phenomenon is easily recognized are applied to the histogram generator 210 by the edge detector 205.

The histogram generator 210 can generate a histogram signal HS on the basis of the grayscales of the pixels which are applied from the edge detector 205.

Alternatively, the histogram generator 210 can derive the histogram signal HS from image signals R, G and B, which are input as an input image, on the basis of the pixel information applied from the edge detector 205.

More specifically, the histogram generator 210 receives the pixel information about the pixels, which have grayscales larger than the grayscale of 10 and grayscale differences below 8, from the edge detector 205. Also, the histogram generator 210 can extract the pixels, which have grayscales larger than the grayscale of 10 and grayscale differences less than the grayscale of 8, from the image signals R, G and B for one frame on the basis of the pixel information. Furthermore, the histogram generator 210 can derive the histogram signal HS based on the grayscales of the extracted pixels.

Moreover, the histogram generator 210 can apply the histogram signal HS to the calculator 230.

The calculator 230 can derive a low grayscale proportion LGP from the histogram signal. The low grayscale proportion LGP can be calculated using the following equation 1.

$$LGP = \frac{Hist1}{Hist1 + Hist2} \quad \text{[Equation 1]}$$

In the equation 1, "Hist1" is the number of pixels having the grayscales of 0 through 63, and "Hist2" is the number of pixels having the grayscales of 190 through 255.

The ranges of Hist1 and Hist2 can be varied as needed. As such, Hist1 and Hist2 are not limited to the above-mentioned ranges.

The calculator 230 can read out parameter information about a sensing interval parameter, a gamma reference voltage parameter, and the number of frames from the LUT 220.

The LUT 220 can be tabled as shown in the following table 1 for example.

TABLE 1

| Condition (%) | (n) th frame | (n + 1) th frame | (n + 2) th frame | (n + 3) th frame |
|---|---|---|---|---|
| 0 ≤ LGP < 20 | H | H | H | H |
| 20 ≤ LGP < 40 | H | H | H | L |
| 40 ≤ LGP < 60 | H | H | L | L |
| 60 ≤ LGP < 80 | H | L | L | L |
| 80 ≤ LGP < 100 | L | L | L | L |

Such a table 1 is provided as an example. As such, the table 1 can be modified through an optimizing process or according to design specifications. Therefore, this embodiment is not limited to this.

In the table 1, "H" can include a first sensing interval parameter representing a first sensing interval and a first gamma reference voltage parameter representing a first gamma reference voltage, and "L" can include a second sensing interval parameter representing a second sensing interval longer than the first sensing interval and a second gamma reference voltage parameter representing an second gamma reference voltage higher than the first gamma reference voltage.

The first sensing interval can be shorter than the second sensing interval. For example, the first sensing interval can have a period range of 5~50% compared to the second sensing interval.

If "H" is read out for example, the first sensing interval can be 1 μs. Also, when "L" is read out, the second sensing interval can be 4 μs.

The first gamma reference voltage can be lower than the second gamma reference voltage. The second gamma reference voltage can be an originally-set gamma voltage, and the first gamma reference voltage can be a voltage lower than the originally-set gamma reference voltage.

If "L" is read out for example, the second gamma reference voltage can be 10V. When "H" is read out, the first gamma reference voltage can be 7V. However, they are not limited to these.

For example, the low grayscale proportion LGP is 0% or more and less than 20% (0%≤LGP<20%), a logic state of H can be continuously set for four frames. As such, the sensing interval and the gamma reference voltage can be adjusted to become the first sensing interval and the first gamma reference voltage, respectively, and used to drive the organic light-emitting panel 10 during four frames.

When the low grayscale proportion LGP is 20% or more and less than 40% (20%≤LGP<40%), the logic states of H, H, H and L can be sequentially set for four frames.

When the low grayscale proportion LGP is 40% or more and less than 60% (40%≤LGP<60%), the logic states of H, H, L and L can be sequentially set for four frames.

When the low grayscale proportion LGP is 60% or more and less than 80% (60%≤LGP<80%), the logic states of H, L, L and L can be sequentially set for four frames.

When the low grayscale proportion LGP is 80% or more and less than 100% (80%≤LGP<100%), the logic state of L can be continuously set for four frames.

As such, the image analyzing operation can be performed periodically with a four-frame period to adjust a sensing interval and a gamma reference voltage. The four-frame period is provided as an example. Therefore, the image analyzing operation can be performed periodically with a two-frame period, an eight-frame period or more, but it is not limited to this. In this manner, the sensing interval and the gamma reference voltage can be adjusted periodically with the plural frame periods.

The calculator 230 can apply the gamma reference voltage parameter, which is obtained from the LUT 220, to the gamma reference voltage adjuster 25 shown in FIG. 10 as a gamma control signal GCS. The gamma reference voltage VSS' can be applied to the gamma voltage generator 50 shown in FIG. 1, after being adjusted by the gamma reference voltage adjuster 25.

The calculator 230 can apply the sensing interval parameter obtained from the LUT 220 to the timing controller 240, as a control signal CS. As such, the timing controller 240 can enable the rising time point of the scan signal Scan to be adjusted along the sensing interval included in the control signal CS. To this end, the timing controller 240 can generate the scan control signals SCS' for adjusting the scan signal Scan. The scan driver 40 can generate an adjusted scan signal Scan on the basis of the scan control signals SCS' and apply the adjusted scan signal Scan to the organic light-emitting panel 10. In accordance therewith, the organic light-emitting panel 10 can be driven according to a sensing interval adjusted by the adjusted scan signal Scan.

Some content abridged and omitted from the above-mentioned explanation regarding the controller 30A of the second embodiment can be supported by the description about the controller 30 of the first embodiment and can be easily understood to the ordinary person upon the description and drawings regarding the controller 30 of the first embodiment.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to obtain such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An organic light-emitting display device comprising:

an organic light-emitting panel in which a plurality of pixel regions are arranged, each of the pixel regions comprising:

a switching transistor;

a drive transistor configured to drive an organic light emission element and a sensing transistor configured to detect a threshold voltage of the drive transistor during a sensing interval; and a controller configured to:

compare the pixel number of a low grayscale range and the pixel number of a high grayscale range, which are obtained from an image signal, in each frame; and generate a control signal for adjust the sensing interval and a gamma control signal for adjusting a gamma reference voltage in accordance with a compared resultant, wherein the controller comprises a timing controller configured to generate a scan control signal for adjusting a scan signal based on the control signal.

2. The organic light-emitting display device of claim 1, wherein the controller further comprises:

an image analyzer configured to derive a histogram signal, which includes the pixel number for each grayscale, from the image signal; and a calculator configured to:

compare the pixel number of the low grayscale range and the pixel number of the high grayscale range on the basis of the histogram signal; and generate the control signal for adjusting the sensing interval and the gamma control signal for adjusting the gamma reference voltage in accordance with the compared resultant.

3. The organic light-emitting display device of claim 1, wherein if the pixel number of the high grayscale range is larger than the pixel number of the low grayscale range, the sensing interval is shortened and the gamma reference voltage is maintained as first gamma reference voltage.

4. The organic light-emitting display device of claim 1, wherein if the pixel number of the low grayscale range is larger than the pixel number of the high grayscale range, the sensing interval is lengthened and the gamma reference voltage becomes a second gamma reference voltage higher than the first gamma reference voltage.

5. An organic light-emitting display device comprising:

an organic light-emitting panel in which a plurality of pixel regions are arranged, each of the pixel regions comprising:

a switching transistor;

a drive transistor configured to drive an organic light emission element and a sensing transistor configured to detect a threshold voltage of the drive transistor during a sensing interval; and a controller configured to:

detect pixels included in a mura-recognizable area from an image signal;

calculate a low grayscale proportion based on the detected pixels of the mura-recognizable area; and generate a control signal for adjusting the sensing interval and a gamma control signal for adjusting a gamma reference voltage on the basis of the low grayscale proportion, wherein the controller comprises a timing controller configured to generate a scan control signal for adjusting a scan signal based on the control signal.

6. The organic light-emitting display device of claim 5, wherein the controller further comprises:

a detector configured to detect the pixels included in the mura-recognizable area;

a histogram generator configured to derive a histogram signal, which includes the pixel number for each grayscale, from the detected pixels of the mura-recognizable area; and a calculator configured to:

derive the low grayscale proportion from the histogram signal; and generate a control signal and a gamma control signal, which are adjusted periodically with a frame period, according to the low grayscale proportion, the control signal being used for adjusting the sensing interval, the gamma control signal being used for adjusting the gamma reference voltage.

7. The organic light-emitting display device of claim 6, wherein the frame period includes at least two frames.

8. The organic light-emitting display device of claim 6, wherein the low grayscale proportion is obtained by dividing the pixel number of the low grayscale range with a sum of the two pixel numbers of the low and high grayscale ranges.

9. The organic light-emitting display device of claim 8, wherein:

the low grayscale range includes grayscales of 0 through 63, and the high grayscale range includes grayscales of 190 through 255.

10. The organic light-emitting display device of claim 7, wherein the sensing interval and the gamma reference voltage, which are used in each frame within the frame period, vary with the low grayscale proportion.

11. The organic light-emitting display device of claim 10, wherein if the low grayscale proportion is less than 20%, the sensing interval is adjusted to shorten and the gamma reference voltage is adjusted to be lower than an originally-set gamma reference voltage, in all the frames within the frame period.

12. The organic light-emitting display device of claim 6, wherein if the low grayscale proportion is 80% or more, the sensing interval is adjusted to lengthen and the gamma voltage maintains an originally-set gamma voltage, in all the frames within the frame period.

13. The organic light-emitting display device of claim 6, wherein:

if the low grayscale proportion is at least 20% but less than 80%, the frame period includes at least a first frame;

the first frame has a lengthened sensing interval and the gamma reference voltage equal to an originally-set gamma voltage; and second frame has a shortened sensing interval and the gamma voltage lower than the originally-set gamma voltage.

14. The organic light-emitting display device of claim 5, wherein the pixels included in the mura-recognizable area include at least one pixel, which has a grayscale less than a reference value or has grayscale difference larger than a critical value.

15. The organic light-emitting display device of claim 2, further comprising a power supplier configured to adjust the gamma reference voltage for generating a plurality of gamma voltages according to the gamma control signal applied from the controller.

16. The organic light-emitting display device of claim 2, further comprising:

a scan driver configured to apply the scan signal to the organic light-emitting panel according to the scan control signal;

a gamma voltage generator configured to generate the gamma voltages based on the adjusted gamma reference voltage; and a data driver configured to generate a data voltage using the gamma voltages and apply the data voltage to the organic light-emitting panel.

17. A controller, comprising:

a calculating unit configured to:

cooperate with a storage unit including sensing interval parameters stored therein;

generate a control signal; and dynamically set a sensing interval in a non-fixed manner, the sensing interval being a time period during which a threshold voltage of a drive transistor in a pixel circuit is sensed;

shorten the sensing interval in case relatively high grayscale pixels within an image of at least one frame are found to be dominating; and lengthen the sensing interval in case relatively low grayscale pixels within an image of at least one frame are found to be dominating; and a timing controller configured to generate a scan control signal for adjusting a scan signal based on the control signal.

18. The controller of claim 17, wherein:

domination of the relatively high grayscale pixels occurs if the number of pixels corresponding to relatively high gray scale range is greater than the number of pixels corresponding to relatively low gray scale range within the image of at least one frame; and domination of the relatively low grayscale pixels occurs if the number of pixels corresponding to relatively low gray scale range is greater than the number of pixels corresponding to relatively high gray scale range within the image of at least one frame.

19. The controller of claim 18, wherein:

the calculating unit lowers gamma reference voltages in response to a voltage level higher than the threshold voltage being sensed during the shortened sensing interval; and the calculating unit sets original level gamma reference voltages in response to a voltage level at the threshold voltage being sensed during the lengthened sensing interval.

20. The controller of claim 19, wherein the shortened sensing interval is between 5% to 50% of the lengthened sensing interval.

21. The controller of claim 20, wherein image analysis on grayscale pixels are performed periodically for every two frames, four frames, or eight frames, with sensing interval adjustment and gamma reference voltage adjustment being performed accordingly.

* * * * *